(No Model.)
W. G. OWEN.
SIGHT FOR FIRE ARMS.
No. 333,024. Patented Dec. 22, 1885.
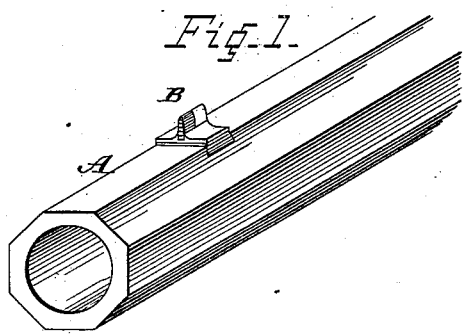
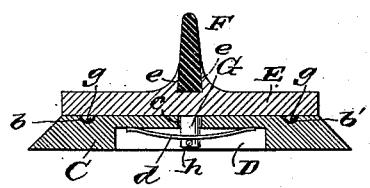
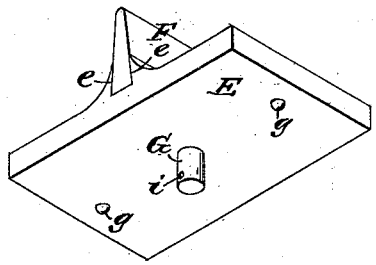
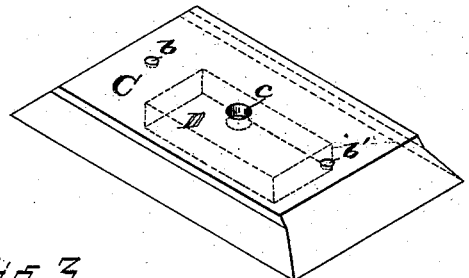
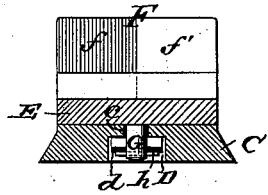
WITNESSES:
INVENTOR:
W. G. Owen
BY Munn & Co.
ATTORNEYS.

UNITED STATES PATENT OFFICE.

WALTER G. OWEN, OF NEW YORK, N. Y.

SIGHT FOR FIRE-ARMS.

SPECIFICATION forming part of Letters Patent No. 333,024, dated December 22, 1885.

Application filed April 11, 1885. Serial No. 161,980. (No model.)

*To all whom it may concern:*

Be it known that I, WALTER G. OWEN, of the city, county, and State of New York, have invented certain new and useful Improvements in Sights for Fire-Arms, of which the following is a full, clear, and exact description.

My invention relates to that class of gun-sights wherein two contrasting colors are combined—generally black and white—to adapt the sight to be used for dark and cloudy as well as fine weather, and in the night.

I have found in practice that the black face of such sights, when used on a gun-barrel that has received a dark dead-finish, is not sharply defined against the dead-finish of the barrel, and consequently the eye is not so quickly attracted to the sight. In trying to overcome this objection I have discovered that under the conditions requiring a dark sight—clear atmosphere, open country, with snow on the ground—that the substitution of a copper for a black substance answers the purpose of instantly attracting the gunner's eye, by standing out in strong contrast from the gun-barrel, and at the same time does not glisten in the sunlight.

The object of my invention is to provide a combined dark and light sight which is plainly visible to the eye, and which can be readily adjusted to bring either the light or dark portion of the sight nearest the eye when aiming.

My invention consists in a sight-bar having its ends similarly shaped and contrastingly colored, mounted on a plate which is adapted to be rotated on a base-plate, and provided with stops for limiting its movements thereon.

It also consists in the peculiar construction and arrangement of parts, as hereinafter fully described, and pointed out in the claims.

Reference is to be had to the accompanying drawings, forming part of this specification, in which similar letters of reference indicate corresponding parts in all the figures.

Figure 1 is a perspective view of a gun-barrel having my improved sight attached. Fig. 2 is a sectional view of the same, taken transversely of the gun-barrel. Fig. 3 is a sectional view taken longitudinally of the gun-barrel. Fig. 4 is a perspective view of the upper plate for supporting the sight. Fig. 5 is a perspective view of the base-plate.

In the drawings, A represents the barrel of the gun, and B the sight, which I will now proceed more fully to describe.

The base-plate C has its front and rear sides beveled or inclined, to fit in a dovetailed groove made transversely across the top of the gun-barrel. This base-plate C has a central perforation, $c$, and on the opposite ends of the plate shallow cavities $b\ b'$ are formed. These cavities $b\ b'$ are in a line with the central perforation, $c$. On the under side of the plate C a rectangular recess, D, is formed, which provides a seat for the spring $d$. The top plate, E, has a transverse slot, $e$, with slightly-inclined sides, to receive the sight F, which is wedge-shaped, to correspond with the inclined sides of the slot $e$, thereby securely holding the sight F in place on the plate E. This sight F is composed of the sections $f\ f'$. The section $f$ is made of copper in a pure state or mixed with any of its alloys. This section $f$ may, however, be made of any material having a coating or enamel of a brown color resembling copper. The section $f'$ is made of ivory, bone, or other analogous substance.

On the under side of the plate E, which works against the upper side of plate C, is a central pivot, G, which passes through the perforation $c$ and into the recess D. This plate E has also two short rounded projections, $g$, in a line with the pivot G, which coincide with and fit into the shallow cavities $b\ b'$. These projections $g$ act to steady the plate E when it rests on the plate C, as in Fig. 2.

To attach the sight to the gun-barrel, the plate E, which carries the sight F, is placed on the plate C, the pivot G passing through the perforations $c$ and into the recess D at the same time the projections $g$ enter the shallow cavities $b\ b'$. The spring $d$, which is slightly curved, has an aperture which registers with the perforation $c$, and through which the end of pivot G projects sufficiently to allow a retaining-pin, $h$, to be passed through the pin-hole $i$ in the end of the pivot G. By these means the plate E is held on the plate C by the action of the spring $d$, so as to allow the plate E to be rotated on the base-plate C. The sight is now attached to the gun-barrel by passing the base-plate C into the dovetailed groove on the gun-barrel.

In Fig. 1 the white section $f'$ is nearest the eye in aiming, and by giving the plate E a half-turn the projections on the said plate E leave the cavities $b\ b'$ on the plate C, and the plate E rotates on the pivot G, which brings the dark or copper section $f'$ in position, facing the marksman.

By using the herein-described sight a hunter while pursuing game can quickly and readily change the sight from light to dark, or vice versa, as occasion may require, without diverting his attention from the game, and without stopping, which is a great advantage, inasmuch as a delay of a moment in adjusting a sight may cause the loss of game.

Having thus described my invention, what I claim as new, and desire to secure by Letters Patent, is—

1. In a sight for fire-arms, a sight-bar having its ends similarly shaped and contrastingly colored, mounted on a plate which is revoluble on a base-plate and provided with stops to limit its movement thereon, substantially as described.

2. The base C, attached to the gun-barrel, having recess D, aperture $c$, and cavities $b\ b'$, in combination with the rotating plate E, having slot $e$, to receive the sight F, central pivot, G, and rounded projections $g$, the spring $d$, for holding the plates together, the pin $h$, fitting in pin-hole $i$ in pivot G, and the sight F, substantially as herein shown and described.

WALTER G. OWEN.

Witnesses:
BENJ. F. HALSKE,
C. SEDGWICK.